Jan. 20, 1953 W. A. R. MALM 2,626,317
RADIO-FREQUENCY FILTER
Filed July 8, 1946

William A. R. Malm
INVENTOR

Patented Jan. 20, 1953

2,626,317

UNITED STATES PATENT OFFICE 2,626,317

RADIO-FREQUENCY FILTER

William A. R. Malm, New Orleans, La.

Application July 8, 1946, Serial No. 681,947

3 Claims. (Cl. 178—44)

(Granted under Title 35, U. S. Code (1952), sec. 266)

The invention described herein may be manufactured and used by or for the Government of the United States of America for governmental purposes without the payment of any royalties thereon or therefor.

This invention relates to radio frequency filters of a type designed for the suppression of a predetermined band of frequencies.

Much loss of efficiency in conventional filters can be partly attributed to excessive inter-coil capacitance which causes leakage from the filter's input terminal to its output terminal, and partly to the excessive inductive reactance at higher frequencies which is due to the effective length of the grounded capacitor's connecting leads.

Capacitors having low inductive reactance to radio frequencies have been developed to provide high capacitance filtering without inductance coils, however, laboratory tests have shown that a capacitor in any circuit using make-and-break contact points will tend to shorten the life of the points by causing excessive sparking between said points during each discharge interval of said capacitor, unless there is sufficient inductance in the circuit to absorb the current surges created by the capacitive discharges.

An object of this invention is to provide a simple yet an efficient radio frequency filter, with optimum values of capacitance and inductance for a given band of frequencies, said filter having minimum inter-coil capacitance yet adequate mutual inductance, and minimum inductive reactance toward ground.

A further object of this invention is to provide a simple yet an efficient radio frequency filter in which the inductance is of such a value that the effective capacitance between each of its coil turns and ground will function with said inductance for adequate filtering, and yet said capacitance will not be sufficient to cause excessive sparking at contact points when used in a circuit having make-and-break contact points.

Other and ancillary objects of the invention will appear hereinafter.

Referring to the drawing, Fig. 1 is a structural view of the filter which is essentially comprised of two adjacent spiral coils oppositely wound on an iron content core in such a manner that the turns of one coil bear a non-parallel relation to the turns of the other coil, said coils being circumscribed close to their outer turns by a grounded and split metallic band with a suitable dielectric material interposed between turns of the spiral coils and the said metallic band.

Figure 1:
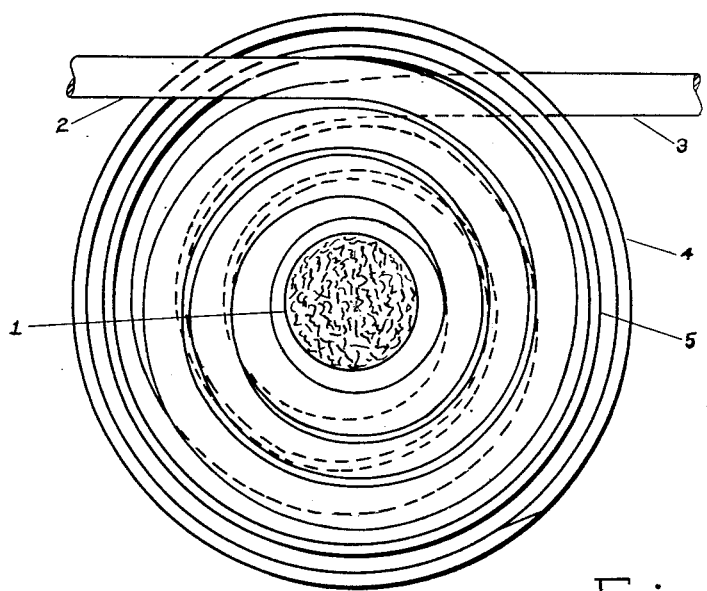
Figures 2, 3:
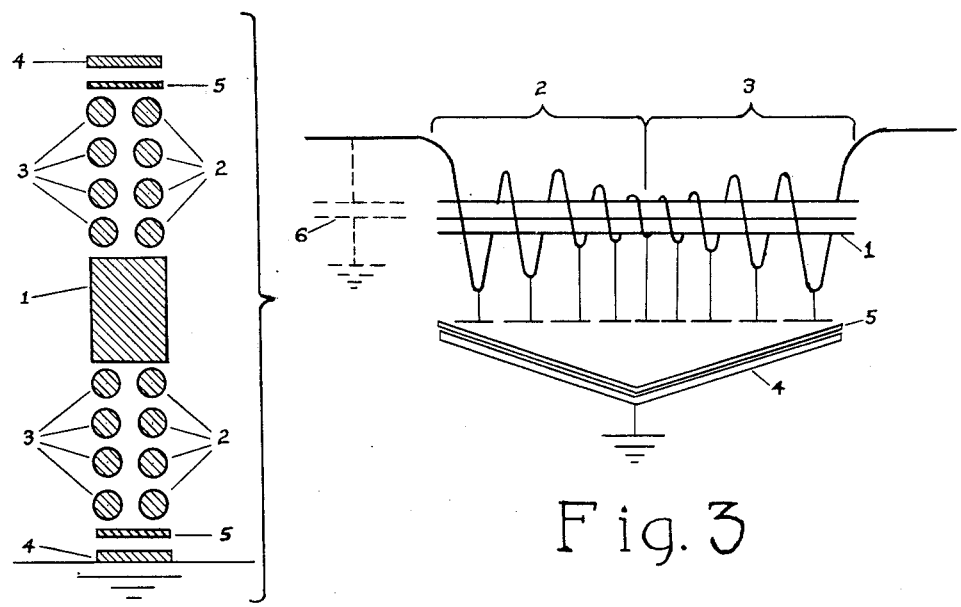
Fig. 2 is a sectional view of Fig. 1.
Fig. 3 is a schematic illustration of the filter's tapering capacitance and inductance.

Description of the drawing will disclose the operational features.

Coil core 1 is a solid mixture of small iron particles, a non-metallic filler, and a suitable binder. 2 is a spiral coil of insulated wire starting at the core and wound in a certain direction, while spiral coil 3 is a continuation of coil 2 and is wound from the core in an opposite direction. Grounded metallic band 4 is drawn closely around the outer turns of coils 2 and 3, after dielectric material indicated by heavy black line 5 has been placed between turns of said coils 2 and 3 and said metallic band 4. Heavy black line 5 is intended to indicate the distribution of dielectric material between all coil turns and metallic band 4, and in such a manner as to effect capacitance between each successive coil turn and said metallic band 4.

Conduction of the current around core 1 by duo-directional spiral coils 2 and 3 is relatively unidirectional as it flows from the outer turn of one coil toward the core, and then to the outer turn of the other coil. This novel coil design provides high inductive efficiency in relation to its conductive material content, and the air spaced non-parallel relation between the turns of each oppositely wound spiral coil reduces inter-coil capacitance to a minimum.

Low inductive reactance toward ground is accomplished by utilizing the effective capacitance between turns of coils 2 and 3 which comprise the conductor and metallic band 4 which is actually ground, thereby eliminating capacitor connecting leads and their inductive reactance which would increase with frequency.

Construction of the filter is not restricted to that shown in the drawing, as the current and frequency for which it may be designed will determine the percentage of iron in the core 1; the size, shape, and material of wire in coils 2 and 3; the type of dielectric material 5; and the material and grounding method of metallic band 4.

As an example, coils 2 and 3 may be wound with a ribbon type of wire with oblong cross-sectional area and using dielectric material of high "K" constant such as titanium dioxide for greater capacitance toward ground, or round cross-sectional area wire with air spacing for less capacitance. The dielectric material may be applied as a separate layer between coil turns and metallic band, as a coating on the wire, or a combination of both.

A small foil-wound compensating capacitor 6 may be added to attenuate the lower frequencies in a broad band when the filter does not provide the required effective capacitance toward ground.

What I claim as new and desire to secure by Letters Patent, is as follows:

1. In a radio frequency filter, a flat single spiral inductance coil winding from its innermost turn toward its outermost turn in a certain direction and closely coupled to a second flat single spiral inductance coil winding from its innermost turn toward its outermost turn in a direction opposite to that in which the first spiral coil is wound, the spacial relation of said spiral coils being such that each successive turn of one spiral coil lies closely adjacent to and almost but not parallel with each successive turn of the other spiral coil, said coils being series connected at their innermost turn adjacent to an iron content core; a grounded and split metallic band closely circumscribing the said spiral inductance coils at their outermost turns, and a dielectric element interposed between the wire turns of said spiral inductance coils and said grounded metallic band.

2. In a radio frequency filter, means for providing high mutual inductance combined with low inter-coil capacitance, comprising a pair of closely coupled single spiral coils, one winding from its innermost turn toward its outermost turn and the other winding from its innermost turn toward its outermost turn in a direction opposite to that in which the first spiral coil is wound, said spiral coils being series connected at their innermost turn adjacent to an iron content core, the spacial relation of said spiral coils being such that each successive turn of one spiral coil lies closely adjacent to and almost but not parallel with each successive turn of the other spiral coil; and means for providing capacitance having low inductive reactance between said spiral inductance coils and ground, comprising a grounded and split metallic band circumscribing said spiral inductance coils at their outermost turns, and a dielectric element interposed between the wire turns of said spiral inductance coils and said grounded metallic band.

3. In a radio frequency filter, means for suppressing a predetermined band of frequencies in a circuit, comprising a pair of closely coupled single spiral coils, one winding from its innermost toward its outermost turn and the other winding from its innermost turn toward its outermost turn in a direction opposite to that in which the first spiral coil is wound, said spiral coils being series connected at their innermost turn closely adjacent to an iron content core, the spacial relation of said spiral coils being such that each successive turn of one spiral coil lies closely adjacent to and almost but not parallel with each successive turn of the other spiral coil; the outermost turns of said spiral inductance coils being connected in series with said circuit, combined with a low inductive capacitor comprised of a grounded and split metallic band closely circumscribing said spiral inductance coils at their outermost turns, and a dielectric element interposed between the wire turns of said spiral inductance coils and said grounded metallic band.

WILLIAM A. R. MALM.

REFERENCES CITED

The following references are of record in the file of this patent:

UNITED STATES PATENTS

| Number | Name | Date |
| --- | --- | --- |
| 734,778 | Varley | July 28, 1903 |
| 1,613,952 | Johnson | Jan. 11, 1927 |
| 1,832,427 | Roller | Nov. 17, 1931 |
| 2,115,826 | Norton | May 3, 1938 |
| 2,227,846 | Rust | Jan. 7, 1941 |
| 2,387,783 | Tawney | Oct. 30, 1945 |
| 2,414,990 | Weed | Jan. 28, 1947 |
| 2,416,683 | Finch | Mar. 4, 1947 |
| 2,452,572 | Jago | Nov. 2, 1948 |
| 2,512,945 | Kallmann | June 27, 1950 |